(12) United States Patent
Lightman et al.

(10) Patent No.: US 6,711,414 B1
(45) Date of Patent: Mar. 23, 2004

(54) WEARABLE COMPUTING DEVICE CAPABLE OF RESPONDING INTELLIGENTLY TO SURROUNDINGS

(75) Inventors: Alexander Lightman, Santa Monica, CA (US); Thad Starner, Atlanta, GA (US)

(73) Assignee: Charmed Technology, Inc., Santa Monica, CA (US)

( * ) Notice: Subject to any disclaimer, the term of this patent is extended or adjusted under 35 U.S.C. 154(b) by 360 days.

(21) Appl. No.: 09/617,718

(22) Filed: Jul. 17, 2000

Related U.S. Application Data

(60) Provisional application No. 60/184,896, filed on Feb. 25, 2000, and provisional application No. 60/190,837, filed on Mar. 20, 2000.

(51) Int. Cl.[7] .................................................. H04Q 7/20
(52) U.S. Cl. .................... 455/517; 455/156.1; 455/457; 342/27; 342/357.07; 340/853.2
(58) Field of Search ............................ 455/9, 456, 457, 455/575, 95, 151, 156.1, 517; 340/3.1, 853.2; 342/27, 28, 90, 357.07, 357.08

(56) References Cited

U.S. PATENT DOCUMENTS

| | | | |
|---|---|---|---|
| 5,262,940 A | | 11/1993 | Sussman |
| 5,383,111 A | | 1/1995 | Homma et al. |
| 5,798,693 A | * | 8/1998 | Engellenner ............. 340/10.33 |
| 5,845,282 A | | 12/1998 | Alley et al. |
| 5,887,063 A | | 3/1999 | Varadharajan et al. |
| 5,921,409 A | | 7/1999 | Gerber et al. |
| 5,930,769 A | | 7/1999 | Rose |
| 5,943,653 A | | 8/1999 | Ross et al. |
| 5,956,658 A | | 9/1999 | McMahon |
| 5,960,085 A | | 9/1999 | De la Huerga |
| 6,054,928 A | * | 4/2000 | Lemelson et al. ....... 340/573.4 |
| 6,199,077 B1 | | 3/2001 | Inala et al. |
| 6,272,545 B1 | | 8/2001 | Flanagin et al. |
| 6,292,657 B1 | | 9/2001 | Laursen et al. |
| 6,314,457 B1 | | 11/2001 | Schena et al. |
| 6,324,542 B1 | | 11/2001 | Wright et al. |
| 6,330,618 B1 | | 12/2001 | Hawkins et al. |
| 6,336,142 B1 | | 1/2002 | Kato et al. |
| 6,347,301 B1 | | 2/2002 | Bearden, III et al. |
| 6,418,326 B1 | * | 7/2002 | Heinonen et al. ........... 455/558 |
| 6,446,871 B1 | | 9/2002 | Buckley et al. |
| 6,490,610 B1 | | 12/2002 | Rizvi et al. |
| 2001/0055978 A1 | * | 12/2001 | Herrod et al. ............... 455/517 |

OTHER PUBLICATIONS

Palm Pilot Handbook, 3Com Corporation, 1997. Chapter 10, pp. 141–154.

* cited by examiner

Primary Examiner—Cong Van Tran
(74) Attorney, Agent, or Firm—Beyer Weaver & Thomas, LLP

(57) ABSTRACT

Techniques and approaches that enable wireless communication devices, namely, wearable devices, to assist users in new ways by interacting with other devices or surroundings to notify users of things that would be of interest to users. In one aspect of the invention, wearable devices display information for users in response to surrounding signals. The surrounding signals can come from a nearby wireless transceiver that may be included in another wearable device, a terminal device or an isolated device provided in a setting. In another aspect of the invention, wireless communication or computing devices (e.g., wearable devices) can interact and perform social filtering. The users of the devices can then be suitably notified.

20 Claims, 9 Drawing Sheets

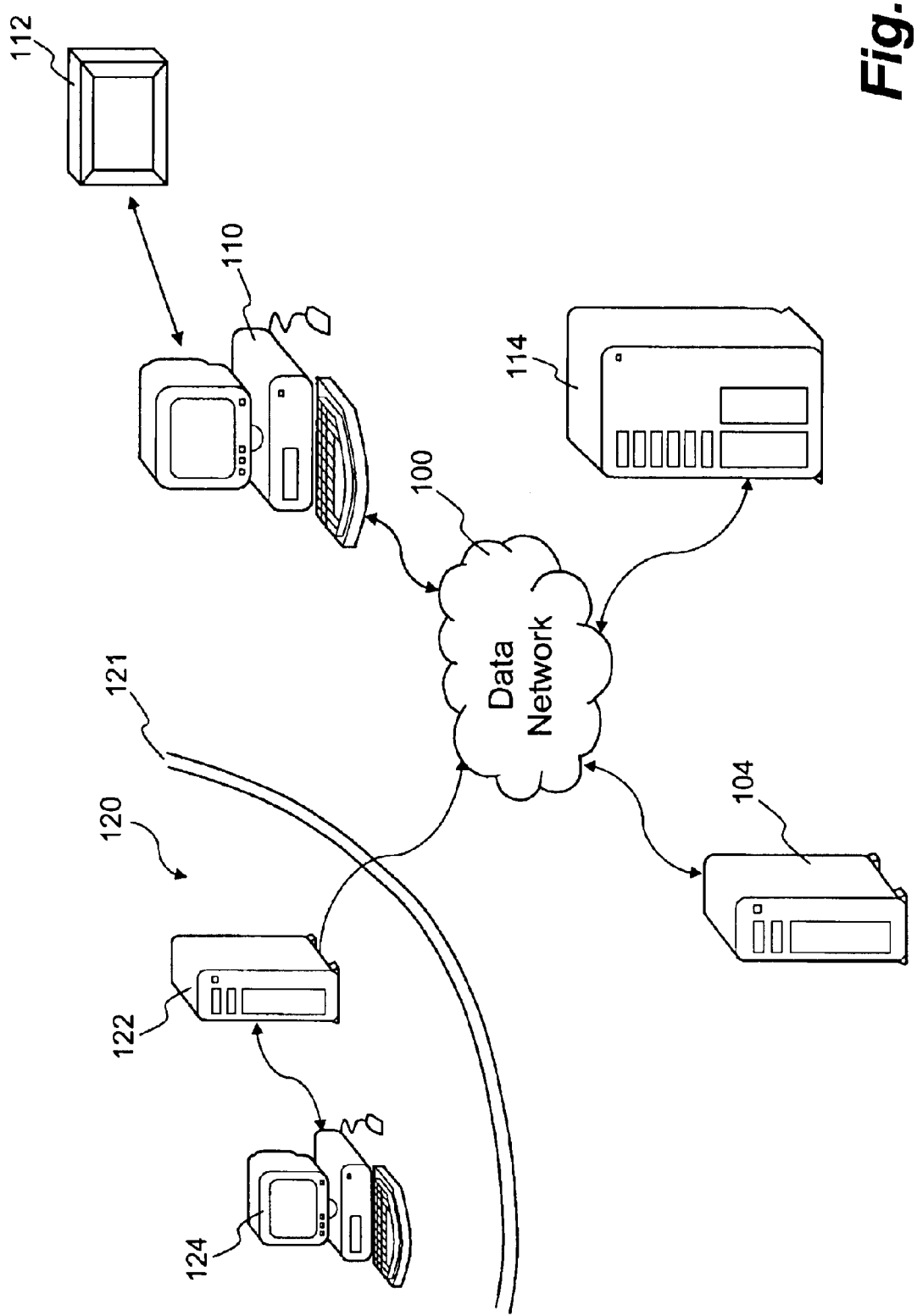

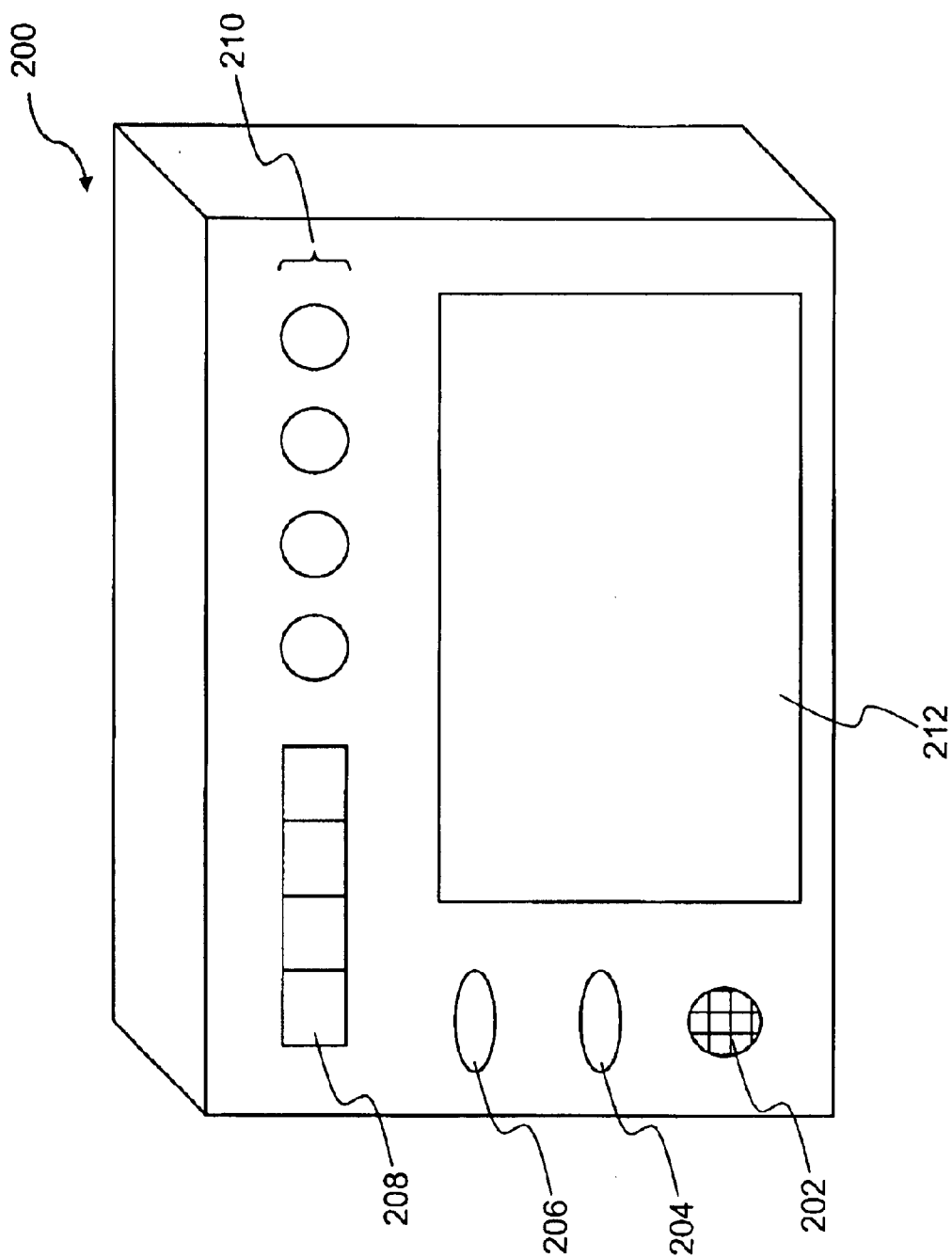

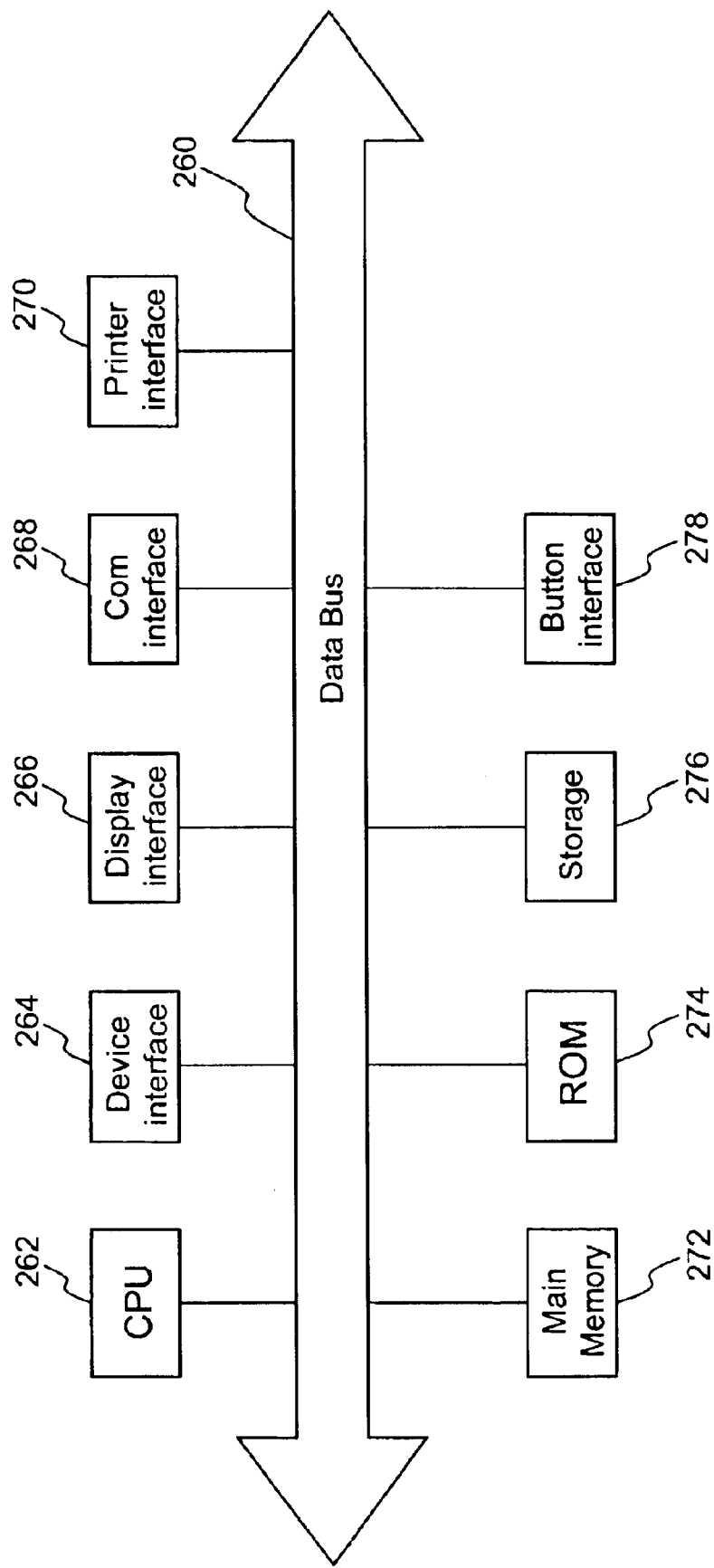

WEARABLE COMPUTING DEVICE CAPABLE OF RESPONDING INTELLIGENTLY TO SURROUNDINGS

CROSS-REFERENCE TO RELATED APPLICATIONS

This application claims the benefit of: (i) U.S. Provisional Application No. 60/184,896, filed Feb. 25, 2000, by Lightman et al., and entitled "Method and System for Facilitating Use of Wearable Devices", the content of which is hereby incorporated by reference; and (ii) U.S. Provisional Application No. 60/190,837, filed Mar. 20, 2000, by Lightman et al., and entitled "WEARABLE DEVICES", the content of which is hereby incorporated by reference. This application is also related to: (i) U.S. application Ser. No. 09/561,434, filed Apr. 28, 2000, by Lightman et al., and entitled "METHOD AND SYSTEM FOR DATA TRANSMISSION BETWEEN WEARABLE DEVICES OR FROM WEARABLE DEVICES TO PORTAL", the content of which is hereby incorporated by reference; (ii) U.S. application Ser. No. 09/561,288, filed Apr. 28, 2000, by Molloy et al., and entitled "MARKETING AND PROMOTION OF TECHNOLOGY PRODUCTS USING SHOWS OR EVENTS", the content of which is hereby incorporated by reference; and (iii) U.S. application Ser. No. 09/561,289, filed Apr. 28, 2000, by Lightman et al., and entitled "METHOD AND SYSTEM FOR EVENT INTERACTION MONITORING", the content of which is hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to wireless devices and, more particularly, to wearable devices capable of responding intelligently to surroundings.

2. Description of the Related Art

The Internet is a rapidly growing communication network of interconnected computers and computer networks around the world. Together, these millions of connected computers form a vast repository of multimedia information that is readily accessible by any of the connected computers from anywhere at any time. Further, these millions of connected computers provide a reliable means for users to stay in touch from anywhere at any time by way of emails, voices, images or videos. To provide mobility and portability of access to the Internet, mobile communication or computing devices (also known as wireless communication devices) are introduced and capable of communicating, via wireless networks, with the Internet.

The wireless communication devices or mobile computing devices are normally smaller scale computing devices. Examples of such devices include two-way pagers, cellular phones, palm-sized computing devices and personal digital assistant (PDA) apparatuses. These devices enable users to receive, collect, analyze, review and disseminate information as they travel or move about. Although the ability of wireless communication devices or mobile computing devices to receive, collect, analyze, review and disseminate information is very beneficial, these types of devices are nevertheless limited in the ways they assist users.

There is therefore a need for wireless communication devices that are better able to assist their users.

SUMMARY OF THE INVENTION

The invention relates to techniques that enable wireless communication devices, namely, wearable devices, to assist users in new ways by interacting with other devices or surroundings to notify users of things that would be of interest to users. In one aspect of the invention, wearable devices display information for users in response to surrounding signals. The surrounding signals can come from a nearby wireless transceiver that may be included in another wearable device, a terminal device or an isolated device provided in a setting or area. In another aspect of the invention, wireless communication or computing devices (e.g., wearable devices) can interact and perform social filtering. The users of the devices can then be suitably notified with respect to the results of the social filtering.

The invention can be implemented in numerous ways including, as a method, an apparatus, a computer readable medium, and a computer system. Several embodiments of the invention are discussed below.

As a method for displaying information on a wireless device having a display, one embodiment of the invention includes at least the acts of: detecting presence of another wireless device; receiving, from the another wireless device, a request to display identifiable information on the display of the wireless device after the detecting has detected the presence of the another wireless device; and displaying the identifiable information on the display of the wireless device in response to the request.

As a method for exchanging data between wearable computing devices, one embodiment of the invention includes at least the acts of: determining whether a first wearable computing device having a display can presently communicate with a second wearable computing device; sending a data exchange request from the first wearable computing device to the second wearable computing device when the determining determines that the first wearable computing device can presently communicate with the second wearable computing device, the data exchange request requesting a data exchange between the first wearable computing device and the second wearable computing device; receiving a request response at the first wearable computing device, the request response indicating whether the second wearable computing device has authorized the data exchange; performing the data exchange between the first wearable computing device and the second wearable computing device when the request response indicates that the second wearable computing device has authorized the data exchange; examining at least one of the data received at the first wearable computing device and the request response to determined whether the second wearable computing device desires to have certain information displayed on the display of the first wearable computing device; and displaying the certain information on the display of the first wearable computing device when the examining indicates that the second wearable computing device desires to have certain information displayed on the display of the first wearable computing device.

As a method for exchanging data between wearable computing devices, one embodiment of the invention includes the acts of: determining whether a first wearable computing device can presently communicate with a second wearable computing device; sending a data exchange request from the first wearable computing device to the second wearable computing device when the determining determines that the first wearable computing device can presently communicate with the second wearable computing device, the data exchange request requesting a data exchange between the first wearable computing device and the second wearable computing device; receiving a request response at the first wearable computing device, the request response indicating whether the second wearable computing device has authorized the data exchange; performing the data exchange between the first wearable computing device and the second wearable computing device when the request response indicates that the second wearable computing device has authorized the data exchange; and thereafter performing social filtering on the data received by at least one of the first wearable computing device and the second wearable computing device based on predetermined criteria.

The advantages of the invention are numerous. Different embodiments or implementations may yield one or more of the following advantages. One advantage of the invention is that wireless communication devices (e.g., wearable devices) can easily acquire from or transmit data to other wearable devices or terminal devices. Another advantage of the invention is that wireless communication devices (e.g., wearable devices) can interact with other devices or surroundings to notify users of things that would be of interest to their users.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 1 illustrates a system configuration in which the invention may be practiced;

FIG. 2A illustrates an exemplary configuration of wearable device according to one embodiment of the invention;

FIG. 2E is a functional block diagram of a wearable device according to one embodiment of the invention;

DETAILED DESCRIPTION OF THE INVENTION

Figure 2C:
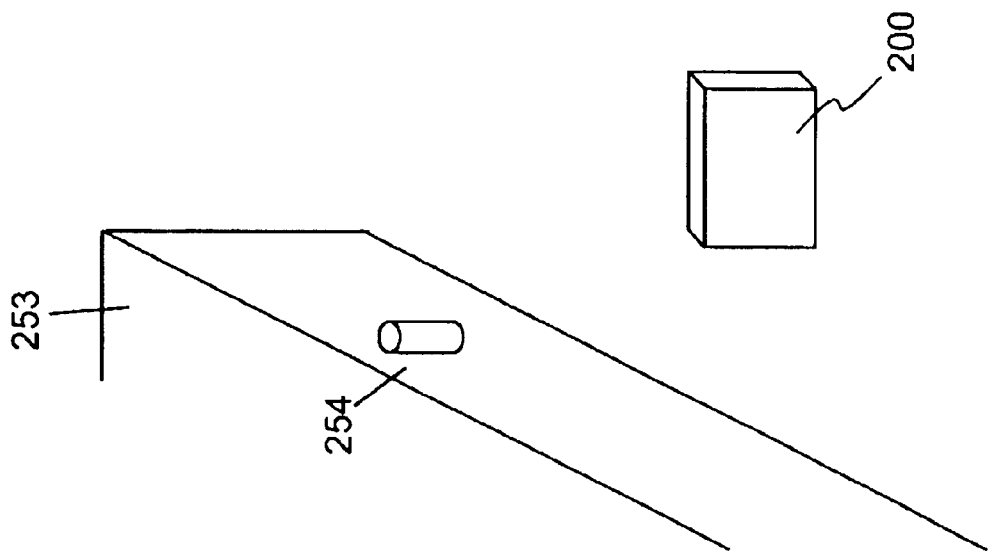
FIG. 2C illustrates a perspective view of a badge (a user thereof) passing through an area or setting that includes a transceiver.

The invention relates to techniques that enable wireless communication devices, namely, wearable devices, to assist users in new ways by interacting with other devices or surroundings to notify users of things that would be of interest to users. In one aspect of the invention, wearable devices display information for users in response to surrounding signals. The surrounding signals can come from a nearby wireless transceiver that may be included in another wearable device, a terminal device or an isolated device provided in a setting. In another aspect of the invention, wireless communication or computing devices (e.g., wearable devices) can interact and perform social filtering. The users of the devices can then be suitably notified.

The wearable devices are more generally electronic devices, such as mobile computing devices or wireless communication devices, and are often small in scale and very portable. Wearable devices are able to communicate with one another or other devices to exchange information. Wearable devices can take many shapes, designs and forms. As examples, the wearable devices can be provided as badges or charms. Wearable devices are preferable those mobile computing devices or wireless communication devices that can be worn by a user without special equipment such as a case, band or pocket that are wearable. In other words, wearable devices are preferably self-wearable.

Embodiments of this aspect of the invention are discussed below with reference to FIGS. 1–6. However, those skilled in the art will readily appreciate that the detailed description given herein with respect to these figures is for explanatory purposes as the invention extends beyond these limited embodiments.

FIG. 1 illustrates a system configuration in which the invention may be practiced. A data network 100 may be the Internet, an Intranet, or some other public or private data network. A personal computer (PC) 110 and a network server 104 coupled to the network 100. The personal computer 110 represents one of many computing devices that couple to the network 100, and the network server 104 represents one of many application/service servers on the network 100. In one implementation, the personal computer 110 runs a HyperText Markup Language (HTML) browser, such as Netscape Navigator from Netscape Communications Corporation (see www.netscape.com) via the network 100 using HyperText Transfer Protocol (HTTP) to access information stored in the network server 104. The network server 104 is typically operated by a business and identified by an Universal Resource Identifier (URI) or a domain name, such as www.cnn.com as a news feeding site and www.amazon.com as a electronic retailer selling from books to consumer electronics. Typically, the information stored in the network server 104 is hypermedia information to facilitate various transactions with the personal computer 110 operated by one or more users.

Also shown in FIG. 1 the system configuration can also include a private network 120 including a computer 124 and a server 122. The private network 120 uses a firewall 121 to protect resources of the private network from users on other networks. The private network 120 is typically used in a confined configuration in which secure information is kept in the server 122 and accessible only by certain limited computing devices (e.g., the computer 124). In one example, the private network 120 is a local area network.

As shown in FIG. 1 is a wearable two-way communication device 112, referred to herein as a wearable device, that is designed to be able to communicate wirelessly with the personal computer 110 or the computer 124. It should be recognized, that although a single wearable device 112 is shown in FIG. 1, the system configuration normally supports a plurality of wearable devices. To facilitate the use of the wearable device 112, a portal server 114 hosts a portal accessible via the data network 100 such as by the personal computer 110 or the computer 124. The portal comprises various kinds of information and data that can be accessed. Additionally, the portal can provide services or applications. For example, the portal can provide an email service to keep the wearable device 112 in touch with other wearable devices. Additional detail on the portal is provided below.

The wearable device 112 can take many forms, designs or shapes. For example, in one implementation, the wearable device 112 can have a badge-like design, and in another implementation can have a charm like design. The functions or features provided by the wearable device 112 can also vary widely. FIG. 2A illustrates an exemplary configuration of wearable device 112 according to one embodiment of the invention. As shown in FIG. 2A, the wearable device 112 is designed like a badge 200. The badge 200 can be attached to a user's clothing or wore by chain around the user's neck. In one implementation, the badge 200 is approximately 2.5 by 3.5 inches and includes a display screen. While this particular embodiment implements a wearable device as a badge, it should be recognized that the wearable device can be instantiated in various other forms, shapes and designs that lend themselves to being wearable.

The badge 200 incorporates a wireless communication apparatus 202 that permits badge 200 to exchange information with another device, such as a badge, a terminal device or an area (or setting) having a corresponding wireless communication apparatus. The terminal device may correspond to the personal computer 110 or the computer 124 of FIG. 1 that can be equipped with a corresponding wireless communication apparatus for communicating with the badge 200. Examples of the area or setting can include an entrance door or a walkway to a product display booth or an area that can cause the badge 200 to display pertinent information.

The badge 200 can further comprise an audible device 204, a microphone 206, a plurality of indicators 208, and a plurality of activation buttons 210. In addition, badge 200 includes a display 212 such as a Liquid Crystal Display (LCD) or a graphic display. A LCD display provides a visual mechanism for the user to more effectively interact with the badge 200 or for others to view information being displayed on the display 212 of the badge 200. The audible device 204 may be used to produce sound that a user of the badge 200 can hear. In one embodiment, the sound may be generated from a text via a text-to-sound translator. The microphone 206 is typically used for recording when there is a need. For example, when the user needs to record a short conversation, one of the activation buttons may be activated to start the recording. The indicators 208 include a number of LEDs in one embodiment. The LEDs can be used for various purposes. In one embodiment, each of the LEDs is designated to indicate a message. For example, one LED on in green color indicates that the badge 200 is communicating with another device (e.g., another badge or a terminal device). When the LED turns red, that means the communication is done. Depending on an exact implementation, the indicators 208 can be designed for many different purposes. One of the purposes is to have one or more of the indicators "on" when there is a high affinity between two users in communication. In other words, each user stores his/her interest/search criteria in his/her badge, when two badges exchange information therebetween and a match score exceeds a threshold, the users can be notified by one of more of the indicators 208. As the name suggests, the activation buttons 210 provides a mechanism for the user to interact with or control the operation of the badge 200. In a preferred embodiment, the activation buttons 210 are designed to be small in size and the number of activation buttons 210 is less than the number of button in a phone keypad or a computer keyboard.

Figure 2B:
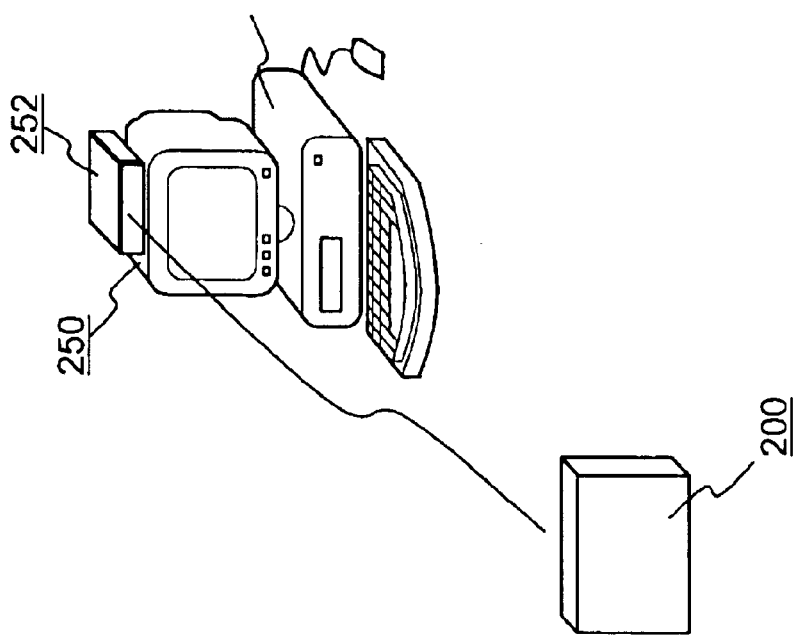
FIG. 2B illustrates a perspective view of a terminal device equipped with a wireless communication apparatus according to one embodiment of the invention.

FIG. 2B illustrates a perspective view of a terminal device 250 equipped with a wireless communication apparatus 252. When a user of the badge 200 walks up to the terminal device 250, data can be exchanged between the badge 200 and the terminal device 250 after initiated by either the badge 200 or the terminal device 250. The terminal device 250 may be used to allow access to a portal page for the user to interact therewith.

Figure 2D:
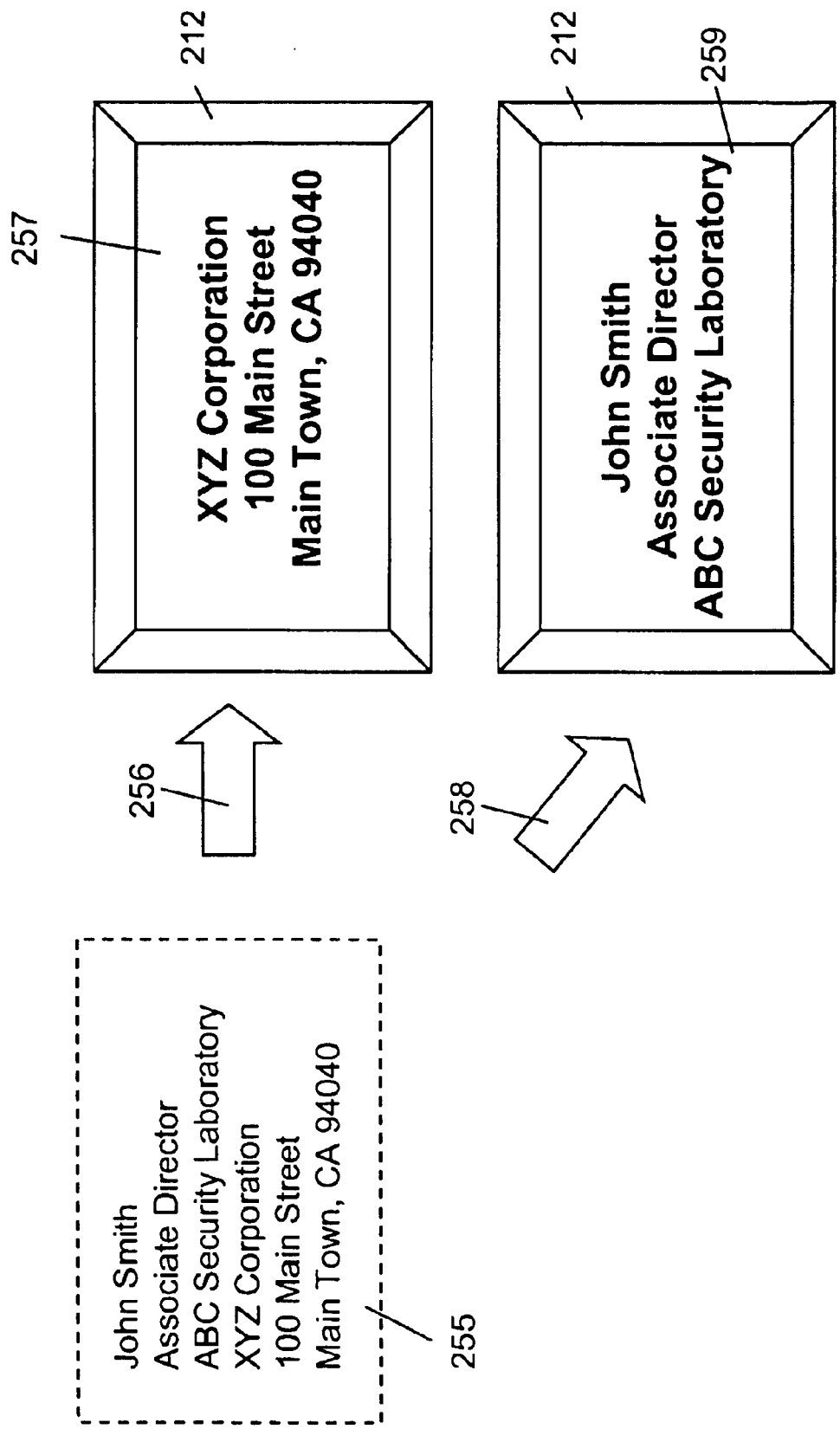
FIG. 2D shows an example in which preloaded information in a badge can be displayed selectively depending on what external signal is received.

FIG. 2C further illustrates that a user wearing the badge 200 approaches an area or setting 253 (e.g., a wall or a panel) that includes a transceiver 254. Here, the transceiver 254 represents a wireless communication apparatus. According to one aspect of the embodiment, the transceiver 254 is connected to a terminal device. Depending on an exact implementation, the transceiver 254 sends a signal that causes the badge 200 to display specific information on the display 212 thereof. FIG. 2D shows an example in which preloaded information 255 in the badge 200 can be displayed selectively depending on what external signal is received. For example, when the user of the badge 200 enters the premises of a company, the badge the user wears can be triggered by a signal 256 from a nearby transceiver to display affiliation information on the display 212 so that a receptionist knows the user is affiliated with the company. As another or further example, when the user enters a secure area, signal 258 triggers the badge 200 to display more detailed affiliated information 259 on the display 212 so that a security guard is aware that the incoming person is permitted to enter the secured area.

According to one embodiment, the wireless communication apparatus 202 and 252 or transceiver 254 include at least infrared transmitter and receiver components (not shown) supporting serial infrared communications links with other devices. A variety of infrared communications devices, such as Hewlett Packard's HSDL-1001 transceiver components, may be used to implement the infrared communication apparatus. As another example, Bluetooth technology is used to implement the communication between the devices. Bluetooth is a computing and telecommunications industry specification that describes how small devices such as mobile phones, computers, and personal digital assistants (PDAs) can easily interconnect with each other and with home and business phones and computers using a short-range wireless connection. Alternatively, other communication apparatuses, such as those utilizing acoustic, radio frequency, or electromagnetic coupling, may be used to support the wireless communication apparatus.

Further, the wearable device, e.g., badge 200, operates under an operating system, such as Microsoft's Windows CE, Linux, or a distilled version of Linux (referred to herein as Nanix). With the operating system, badge 200 can provide many advantages and benefits over those conventional mobile devices operating that lack an operating system. In one implementation, the operating system is (1) compact, offering high performance in limited memory configurations; (2) scalable, supporting a range of embedded, mobile or multimedia product lines; (3) portable, enabling OEM & customer microprocessor choice; and (4) managed, including integrated power management. Further, the operating system is a 32-bit, multitasking, multithreaded operating system that has an open architecture design, providing support for a variety of devices. The operating system makes possible new categories of products that can 'talk' to each other, share and exchange information, and communicate with a wide variety of enterprise systems or the Internet.

FIG. 2E is a functional block diagram of a wearable device (e.g., badge 200) according to one embodiment of the invention. The wearable device includes a central processing unit (CPU) 262 interfaced to a data bus 260. The CPU 262 executes certain instructions to manage all parts and interfaces coupled to the data bus 262 for synchronized operations. The device interface 264 may be coupled to an external device such as a personal computer, a terminal device, or a PDA apparatus so that data can be exchanged (uploaded and/or downloaded). Also coupled to the data bus 260 is a display interface 266, a communication interface 268, a printer interface 270, and activation button interface 278.

Main memory 272, such as random access memory (RAM), is also interfaced to data bus 260 to provide CPU 262 with instructions and data. A memory storage 276 is also coupled to the data bus 260 to provide access to other data and instructions. In particular, when executing stored application program instructions, such as the complied and linked version of the operating system or processes associated with the invention, CPU 122 is caused to manipulate the data to achieve desired results. A Read Only Memory (ROM) 274 is provided for storing invariant instruction sequences such as an operating system or a basic input/output operation system (BIOS) for operation of certain aspects of the wearable device.

It should be noted that the block diagram of FIG. 2E pertains to one embodiment of the invention. However, other embodiments of wearable devices (e.g., badges) may employ some of the parts shown in FIG. 2E or may employ additional parts. Hence, the parts and configurations in FIG. 2E shall not be considered as limitations limiting the invention thereto.

Figure 3:
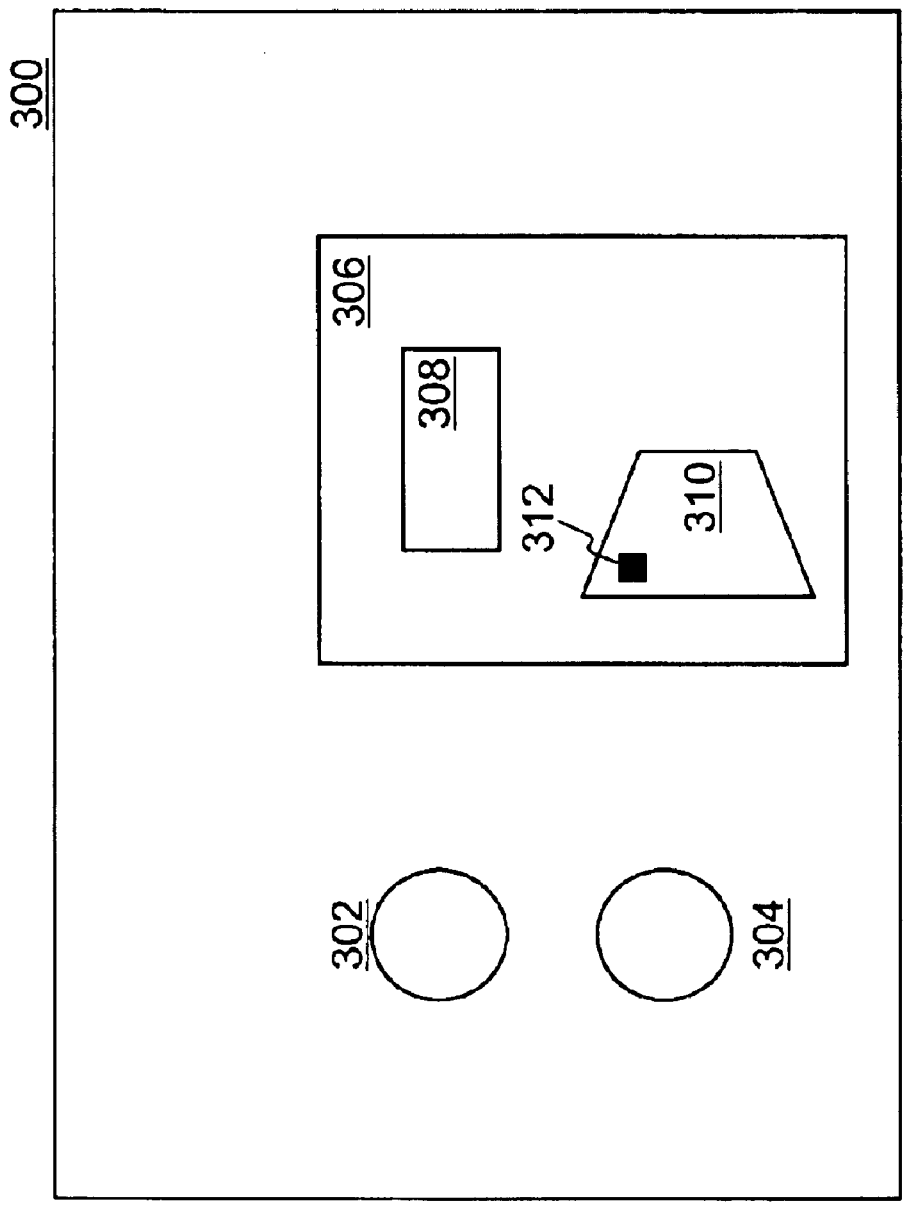
FIG. 3 is a diagram of a representative event portion where attendees can wear wearable devices to acquire and/or exchange information with other attendees as well as booths.

There are various environments that are well suited for use of wearable devices (e.g., badges) to exchange data with other devices and/or to display information. FIG. 3 is a diagram of a representative event portion 300 where attendees can wear wearable devices to acquire and/or exchange information with other attendees as well as booths. The wearable devices can also display data of various sorts. The event portion 300 typically represents at least a portion of an event. Examples of events include a convention, a conference, a show or the like. Booths can be provided at the events for promotion of products to the attendees of the event. The booths represent one type of area or setting that can be provided with wireless communication devices. Hence, the wearable device advantageously allows and promotes information exchange and display during events.

The representative event portion 300 includes two users 302 and 304, both of which wear wearable devices (e.g., badges). It is assumed that the user 302 is a visitor to a show booth 306 attended by a representative 304. The show booth 306 is provided to promote and demonstrate a product 308. The show booth 306 is also provided with a terminal device 310 that is incorporated with a wireless communication apparatus (i.e., a transceiver) 312.

An example of the operation of the event portion 300 is as follows. Assume that, when attendees to the event register, they are issued wearable devices (e.g., badges). Each of the wearable devices can contain a digital version of a business card or pertinent information of the attendee (user). Namely, the user 302 is issued one of the wearable devices. When the user 302 eventually walks to the show booth 306, the representative 304 typically desires to obtain related information about user 302 particularly when the user 302 appears to be interested in the product 308 or wants to exchange information with the representative 304. Conventionally, the user and the representative would have to search for a business card and then exchange their cards. If either the user or the representative were unable to find their business cards, then conventionally one or both would have to write down related information on a piece of paper. Hence, conventional approaches are not very satisfactory and prone to loss of the information.

The invention offers a much better approach. With the invention, both the users 302 and the representative 304 need to simply activate one of the activation buttons on his/her own wearable device or simply be in range for communications to occur. Digital information stored in each wearable device can then be transmitted to the other wearable device. At the end of the day, the badge of the user can be plugged into a terminal device (or otherwise communicate with the terminal device) to upload, archive, analyze, disseminate or print out a list of all of the contacts the user has made during the event. As a result, the user no longer needs to bother with a pile of business cards or scraps of paper containing contact information and thus contact information is more easily and reliably acquired. In addition, the invention makes it much simpler for the show booth 306 to collect information about visitors (e.g., user 302) that have come to examine the product 308. The transceiver 312 deployed at the show booth 306 can exchange information with the user 302. For example, the user 302 could initiate the data exchange by activating one of the activation buttons on the wearable device or one badge initiates the data exchange automatically with another one when the badge detects the presence of the another one. The data exchange can, for example, include a release of contact (or profile) information from the wearable device worn by the user 302 to terminal device 310, and/or collection of booth-related information from the terminal device 310 at the show booth 306. The booth-related information can include product information for the product 308, business information for the business operating the show booth, or event information (schedules, topics, announcements).

Additionally, the invention can also cause the displays of the badges to display pertinent information. The particular information being displayed can be controlled by one or more of user preferences, comparison of incoming data with predetermined conditions, or direction of the other wearable device. More particularly, the display of a badge can be controlled to display information of interest to either the user of the badge or others that may view the display. For example, the display of the badge can display information about the user (name and/or affiliation information). This allows the badge to serve as a sophisticated name tag. As another example, the badge can display information for the user of the badge. The user might want to lookup and display contact information for someone. The user might also want to display a schedule, a layout, or a map associated with an event. Still another example, the badge can display information for the benefit of others. The badge can be signaled by other devices (wearable devices or devices within nearby areas) to display certain information on their displays. Here, the display can, for example, display affiliate information, notifications, information pertaining to an affinity matching, or information pertaining to social filtering. The display of the badge can also cycle through displaying a series of different screens so that more than one screen's worth of information can be presented.

Badge enabled users have access to each other and all vendors that they met at a particular event. Vendors are also able to know what users have visited their booths, and the profiles of these users. Further, users have the ability to share who they came in contact with, for how long they spoke with them, and how to reach these people via their e-mail addresses if the person or persons that they are speaking with care to share their information through use of wireless communications provided with the badges. The badges can also record conversations of its user and other users. A user can also mark or indicate a conversation as important such as by pressing a button on the electronic badge during or following the conversation or by recording a voice command or annotation for the conversation. Specifically, the badges record information and interface with the portal to provide information on the interactions that people have with other badge wearers as well as the vendors that they have come in contact with. Further, event producers might have access to information about the badge enabled users, where they went, who they talked to, congested areas, popular persons or booths, etc.

As noted above, the invention can also participate in social filtering. The social filtering can allow the data acquired from one or more badges to searched or organized to provide various information. For example, the data can be used to identify those attendees that a badge enabled user spoke with for more than ten minutes, or all people at the event that were talked with by anyone for more than ten minutes. Further, the data can be used to determine who was popular at the event, who should attendees have talked to, etc. Participants can be provided with the ability to restrict the distribution or use of private data.

With respect to FIG. 3, the data exchange between the two users 302 and 304 can provide another example of social data filtering. For example, the user 302 is interested in a particular product or person that must be present at the event but the user 302 has not been able to come across the particular product or person. It is, however, likely that the user 304 may have come across the particular product or person somewhere in the event and the badge thereof may have collected or exchanged with some information from the particular product or person. Based on proper settings in the badge of the user 302, the badge can notify the user 302 that the user 304 shall be consulted about where the particular product or person has been came across when a match or search score has reached a certain level.

Portals, or Internet portals, are World Wide Web (WWW) sites that is or proposes to be major starting sites for users when they connect to the Internet or that users tend to visit as anchor or resource sites. In view of utilities and conveniences provided by portals, it is desired that portals support interactive two-way communication devices so that users of the devices can be constantly provided a communication channel with others in addition to receiving personalized information, content or services from others (or the operator of the portal).

A portal can be specifically designed for use with wearable devices (e.g., badges) and hosted in a server coupled to a data network (e.g. 100 of FIG. 1). The portal is a hub for the user community and a mechanism in which badge enabled individuals can interact with each other and with partner vendors, suppliers and sponsors. The portal is developed to provide the unique experience of connecting badge enabled users from anywhere at any time. The server may be operated by an event sponsor or a business entity and facilitates the use of the badges. Any terminal devices that are coupled to the data network may be used to retrieve data in the portal. The terminal device can, for example, be the computer 110 or 124 of FIG. 1 or the terminal device 310 of FIG. 3.

Data or information can be display on the display of a wearable device for either the user's viewing or another's viewing. For the user's own viewing, the data or information can vary widely. For example, the data or information might be profile information, an affinity score, social filtering information, an advertisement, etc. The display of information for another's viewing can by initiated by the another's wearable device as detailed in FIG. 4.

Figure 4:
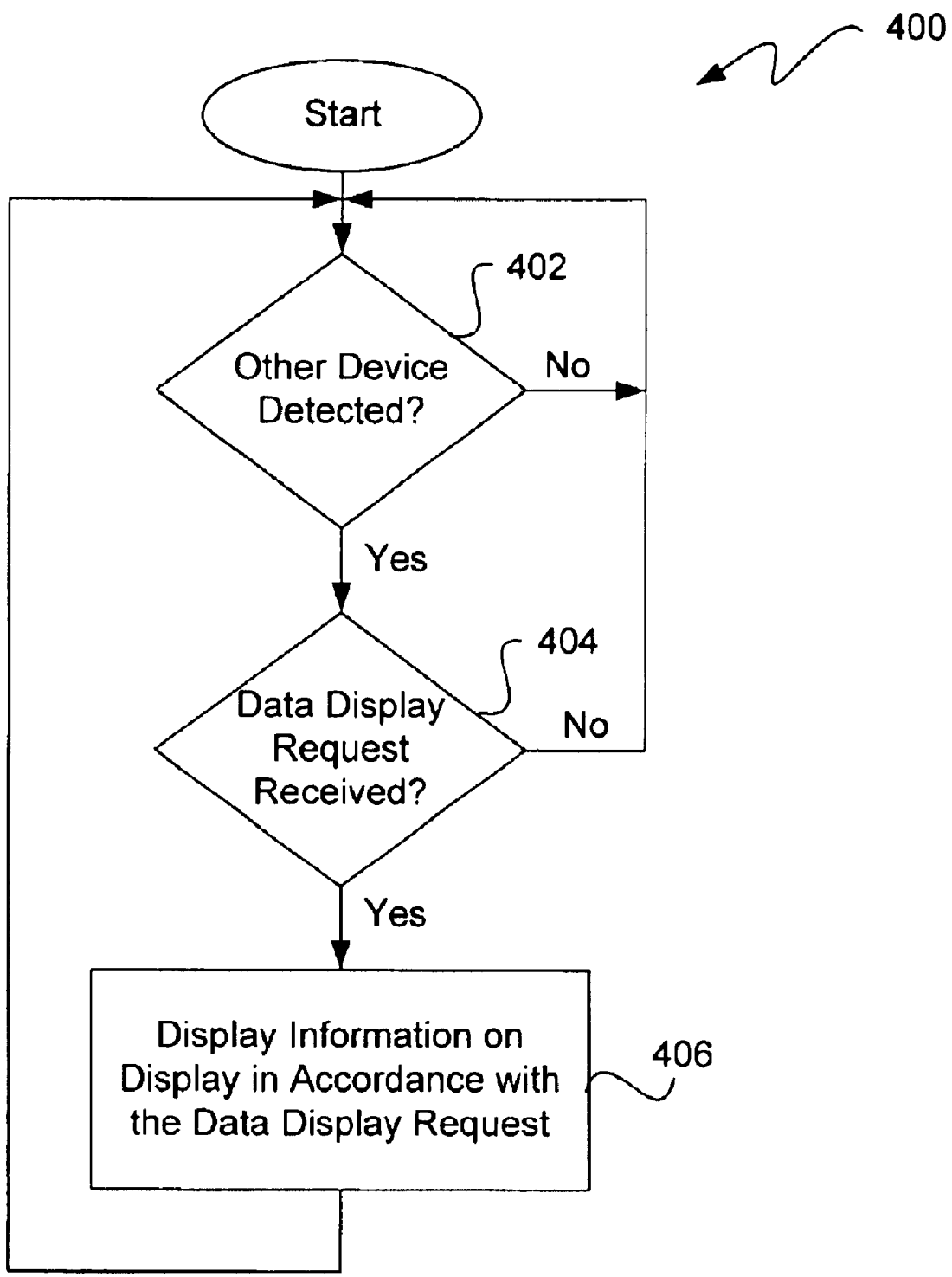
FIG. 4 is a flow diagram of data display processing according to one embodiment of the invention.

FIG. 4 is a flow diagram of data display processing 400 according to one embodiment of the invention. The data display processing 400 is, for example, performed by a wearable device (e.g., badge), such as the wearable device 112 discussed above. The data display processing 400 can be operational whenever the wearable device is operational or can be activated under user control.

The data display processing 400 begins with a decision 402 that determines whether another device is detected. These devices that are detected can be wearable devices, terminal devices or isolated devices. While terminal devices are typically networked with a centralized computer, isolated devices are not networked and operate on their own. When the decision 402 determines that no other devices are detected, the data display processing 400 awaits detection of other devices. In one implementation, the wearable device can search for other devices. Typically, the wearable device would need to come within range of the other devices.

The communication technique preferably utilized between the wearable device and the other devices is a communication technique based on light energy. One example of a communication technique based on light energy is infrared communications. Often, such techniques are referred to as in-sight communication techniques. For example, the other devices can use infrared energy to communicate with the wearable device when the wearable device comes within the limited range of the communication capabilities of the other devices. Since infrared energy primarily uses line of sight to communicate, in order for the wearable device to communicate with the other devices they must be in-sight of each other. Alternatively, the devices could communicate using radio waves.

Once the decision 402 determines that another device has been detected, a decision 404 determines whether the detected other device is requesting the display of particular data on the display of the wearable device. The other devices can request the display of particular data on the display of the wearable device with a data display request. In one embodiment, the other devices that desire to initiate display of information periodically transmit data display requests. In any case, when the decision 404 determines that a data display request has not been received from the detected device, then the data display processing 400 returns to the decision 402 to restart the data display processing 400.

On the other hand, when the decision 404 determines that a data display request has been received from the detected device, then information is displayed on the display of the wearable device in accordance with the data display request. Typically, the information being requested to be displayed is available (e.g., stored on) the wearable device. The particular information to be displayed can be selected, determined or controlled by the data display request. For example, if the wearable device stores user profile information, the data display request can cause some or all of such information to be displayed. As another example, the data display request can cause advertisements, notices, messages, statuses, or other information. Besides governing the particular information to be displayed, the data display request can also govern how the particular information is to be displayed. The particular information can be displayed in a variety of ways. For example, location, size, content, duration, color, etc. can all be controlled. The particular information being displayed can also differ for different wireless devices (or users). Further, the information being displayed can be dependent upon the type of application in which the wearable devices are utilized. Still further, the information being displayed can be presented in a series of screens. The screens in the series can be cycles through after a predetermined amount of time. By cycling the screens larger amounts of information can be presented to its viewers.

Normally, the detected device is compatible with the wearable device when they are designed for intercommunication. However, when the detected device is a foreign device unknown to the wearable device, it is deemed incompatible. The wearable device and the other devices must be compatible for the data display processing 400 to operate to display information on the display of the wearable device. When the detected device is not compatible, the data display processing can simply ignore the incompatible detected device.

Figure 5:
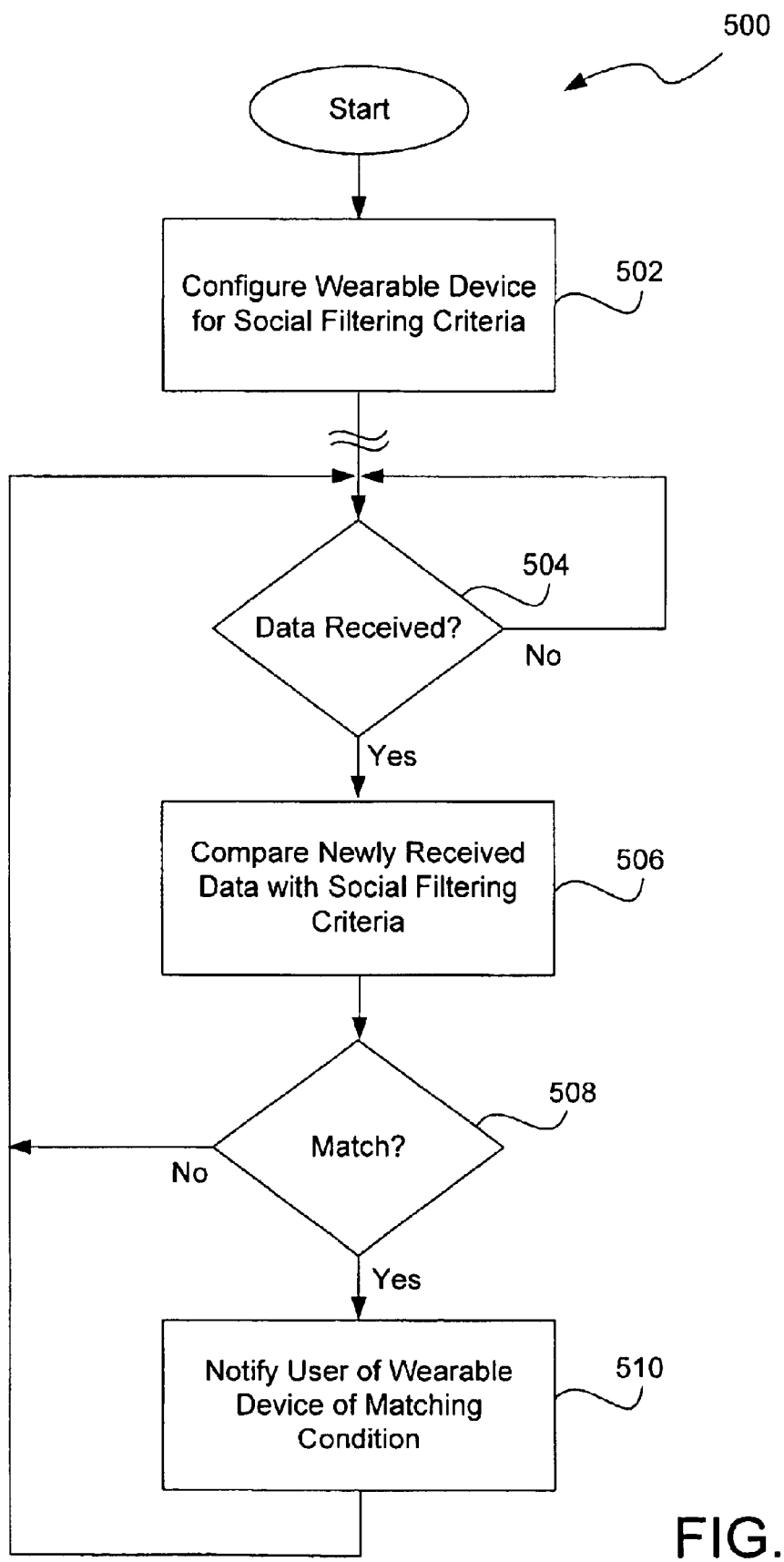
FIG. 5 is a flow diagram of social filtering processing according to one embodiment of the invention.

FIG. 5 is a flow diagram of social filtering processing 500 according to one embodiment of the invention. The social filtering processing 500 is, for example, performed by a wearable device, such as the wearable device 112 discussed above. The social filtering processing 500 can be operational whenever the wearable device is operational or can be activated under user control.

The social filtering processing 500 initially causes the wearable device to be configured 502 for social filtering criteria. Here, the wearable device is provided with the capability to perform social filtering, and thus the user of the wearable device is able to configure the wearable device to perform social filtering in accordance with social filtering criteria provided by the user. The social filtering criteria can vary widely and also depends on the environment in which the wearable devices are used. For example, the social filtering criteria might request that one be notified when communicating with another wearable device that has previously talked with a particular individual, other individuals from a particular company, a host, a dignitary, etc. As another example, the social filtering criteria could cause the wearable device be informed when the other communicating wearable device has visited an area or booth. Still another example is that the social filtering criteria could alert the user of the wearable device when the communicating wearable device is interested in a particular topic, event or subject.

In any case, once the wearable device is configured 502 for social filtering, the wearable device thereafter can operate to perform social filtering processing 500 in accordance with the social filtering criteria. In this regard, a decision 504 determines whether data has been received by the wearable device. When the decision 504 determines that data has not yet been received, the decision 504 causes the social filtering processing 500 to await the reception of data. On the other hand, once the decision 504 determines that data has been received, the newly received data is compared 506 with the social filtering criteria. Here, the social filtering processing 500 operates to determine whether the social filtering criteria are met by the newly received data. In other words, whether the newly received data matches the social filtering criteria. A decision 508 then determines whether a match is present. When the decision 508 determines that the newly received data does not match the social filtering criteria, then the social filtering processing 500 returns to repeat the decision 504 and subsequent blocks so that subsequently received data can be processed. Alternatively, when the decision 508 determines that the newly received data does match the social filtering criteria, then the user of the wearable device is notified 510 of the matching condition. The notification can be achieved in a variety of different ways. For example, the display associated with the wearable device might display the pertinent information regarding the social filtering so that the user of the wearable device is notified of the matching condition. Besides text or graphics provided on the display of the wearable device, audio sounds can additionally or alternatively be used to provide the notification. Still further, separate lights (e.g., Light Emitting Diodes) or icons provided on the wearable device could also be utilized to provide the notification. In yet another embodiment, the notification to the user of the wearable device can be provided by the display of the other communicating wearable device. Here, the display of the other wearable device is typically being viewed by the user of the wearable device and thus by displaying the notification on the other wearable device, the user of the wearable device can be so notified. However, to control the display of the other wearable device, data exchanged between the wearable device and the other wearable device is utilized. Such data exchange can be provided by the data exchange processing illustrated in FIG. 6 as discussed below.

Figure 6:
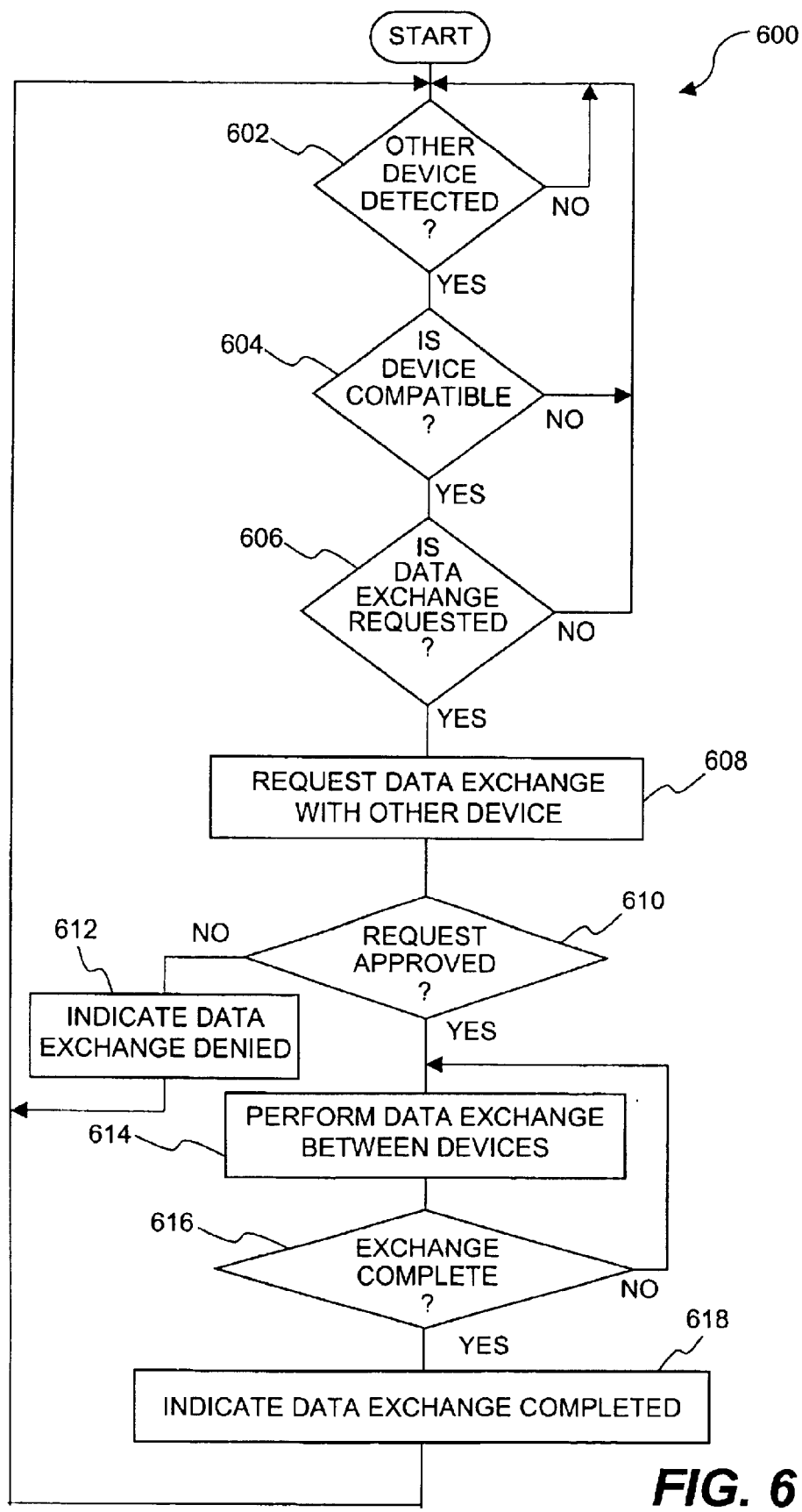
FIG. 6 includes flow diagrams of data exchange processing according to one embodiment of the invention.

FIG. 6 are flow diagrams of data exchange processing 600 according to one embodiment of the invention. The data exchange processing 600 is, for example, performed by a wearable device, such as the wearable device 112 discussed above. The data exchange processing 600 can be operational whenever the wearable device is operational or can be activated under user control.

The data exchange processing 600 begins with a decision 602 that determines whether other wearable devices are detected. When the decision 602 determines that no other devices are detected, the data exchange processing 600 awaits detection of other devices. In one implementation, the wearable devices can search for other wearable devices, terminal devices or isolated devices. Typically, these other wearable devices or terminal devices would need to come within a range of the wearable device. For example, the wearable devices can use infrared energy to communicate with the other wearable devices or terminal devices that come within its limited range. Since infrared energy primarily uses line of sight to communicate, in order for the wearable device to communicate with the other wearable devices or terminal devices they must be in-sight of each other. Alternatively, the devices could communicate using radio waves.

Once the decision 602 determines that another wearable device has been detected, a decision 604 determines whether the detected device is compatible. In one implementation, the detected device is compatible when the detected device is of the same type or designed for intercommunication. However, when the detected device is a foreign device unknown to the wearable device, it is deemed incompatible. In any case, when the decision 604 determines that the detected device is not compatible, the data exchange processing 600 returns to the decision 602 to restart the data exchange processing 600.

On the other hand, when the decision 604 determines that the detected device is compatible, then a decision 606 determines whether data exchange has been requested. The data exchange can be requested either automatically or in a manual manner. As an example, the wearable device can automatically search for other devices and initiate data exchange once other compatible devices are found. On the other hand, the data exchange could be initiated by a user action such as depressing a button on the wearable device. In any case, when the decision 606 determines the data exchange has not been requested, the processing returns to the decision 602 to restart the data exchange processing 600. It should be recognized that the ordering of the decisions 602 and 606 could be switched so that searching for other devices is not performed until data exchange is requested.

Alternatively, when the decision 606 determines that data exchange has been requested, data exchange is requested 608 with the other device that has been detected. The other device is either another wearable device or a terminal device. Next, a decision 610 determines whether the request for data exchange has been approved by the other device. The other device can approve or disapprove of the requested data exchange in a variety of ways. For example, the other device can be configured to operate such that they approve of all requests, approve of requests fitting certain criteria, or require manual approval of the request. When the decision 610 determines that the other device has denied the data exchange, then the device indicates 612 that data exchange has been denied. The indication 612 can be an audio sound to the individual wearing the wearable device, or can be a displayed symbol, image or text on the display screen of the wearable device. Following block 612, the data exchange processing 600 returns to repeat the decision 602 and subsequent blocks so that additional data exchange requests can be processed.

On the other hand, when the decision 610 determines that the requested data exchange is approved, then the data exchange is performed 614 between the devices. A decision 616 then determines whether the data exchange has completed. When the decision 616 determines that the data exchange has not completed, the data exchange processing 600 returns to repeat the operation 614. It should be noted that the data exchange can be performed until successful or a time-out occurs. When the decision 616 determines that the data exchange has completed, then the wearable device indicates 618 that the data exchange has been completed. As an example, the indication 618 can be an audio sound, or can be a displayed symbol, image or text on the display screen of the wearable device. After the indication 618 is provided, the data exchange processing 600 returns to repeat the decision 602 and subsequent operations so that additional data exchange requests can be processed.

Hence, according to the data exchange processing 600 data can be exchanged between wearable devices when they are able to communicate with one another. The communication technique preferably utilized between the pair of wearable devices is a communication technique based on light energy. One example of a communication technique based on light energy is infrared communications. Often, such techniques are referred to as in-sight communication techniques. Further, the type of data being exchanged is normally dependent upon the type of application in which the wearable devices are utilized. In one example, the data being exchanged pertains to profiles of the users that wear the wearable devices. Hence, the data exchange processing 600 can serve to exchange profile information associated with the wearers of the wearable devices. For example, the profile information can include name, business and contact information. In addition, the wearable devices themselves may be able to acquire certain data during their operation. For example, the wearable devices may include an audio and/or video recording mechanism and, if so, such data could also be exchanged between the wearable devices. As another example, the wearable devices may also monitor or produce information on how long users of wearable devices interacted (e.g., conversation) with one another. Still further, the wearable devices can exchange information with other devices (besides wearable devices), such as terminal devices, isolated devices or personal computers.

Besides the direct exchange of information between devices, namely, wearable devices, the devices can also communicate with a server. In one embodiment, the server is referred to as a portal server. The portal server operates as a portal in which users of various devices are able to access the portal content or services via a data network, such as the Internet. The portal server is a port of information that can be accessed by the devices. For example, the portal can be provided on the portal server 114 and accessed by computers 110, 124 shown in FIG. 1.

The invention is preferably implemented in software, but can be implemented in hardware or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, carrier waves. The computer readable medium can also be distributed over a network coupled computer systems so that the computer readable code is stored and executed in a distributed fashion.

The advantages of the invention are numerous. Different embodiments or implementations may yield one or more of the following advantages. One advantage of the invention is that wearable devices can easily acquire from or transmit data to other wearable devices or terminal devices. Another advantage of the invention is that private portals can be provided for users of wearable devices to facilitate retrieval of information previously acquired by the wearable devices and transmitted to the private portals. Still another advantage of the invention is that the wearable devices can take many different configurations, forms, shapes or designs but are generally wearable and light weight.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for exchanging data between wearable computing devices, said method comprising:
(a) determining whether a first wearable computing device having a display can presently communicate with a second wearable computing device;
(b) sending a data exchange request from the first wearable computing device to the second wearable computing device when said determining (a) determines that the first wearable computing device can presently communicate with the second wearable computing device, the data exchange request requesting a data exchange between the first wearable computing device and the second wearable computing device;

(c) receiving a request response at the first wearable computing device, the request response indicating whether the second wearable computing device has authorized the data exchange;

(d) performing the data exchange between the first wearable computing device and the second wearable computing device when the request response indicates that the second wearable computing device has authorized the data exchange;

(e) examining at least one of the data received at the first wearable computing device and the request response to determined whether the second wearable computing device desires to have certain information displayed on the display of the first wearable computing device; and (f) displaying the certain information on the display of the first wearable computing device when said examining (e) indicates that the second wearable computing device desires to have certain information displayed on the display of the first wearable computing device.

2. A method as recited in claim 1, wherein said performing (d) of the data exchange transfers first data from the first wearable computing device to the second wearable computing device, and transfers second data from the second wearable computing device to the first wearable computing device.

3. A method as recited in claim 2, wherein the first data pertains to user profile information of a user of the first wearable computing device.

4. A method as recited in claim 2, wherein the second data pertains to user profile information of a user of the second wearable computing device.

5. A method as recited in claim 2,
wherein the first data is that portion of data stored on the first wearable computing device that is authorized for transmission to the second wearable computing device, and
wherein the second data is that portion of data stored on the second wearable computing device that is authorized for transmission to the first wearable computing device.

6. A method as recited in claim 1, wherein said performing (d) of the data exchange comprises:
(d1) determining first data of available data on the first wearable computing device that is authorized to be transferred to the second wearable computing device; and
(d2) transferring the first data from the first wearable computing device to the second wearable computing device.

7. A method as recited in claim 6, wherein said performing (d) of the data exchange further comprises:
(d3) receiving second data at the first wearable computing device from the second wearable computing device, the second data being that portion of the available data on the second wearable computing device that is authorized to be transferred to the first wearable computing device.

8. A method as recited in claim 6, wherein said determining (d1) of the first data is predetermined.

9. A method as recited in claim 6, wherein said determining (d1) of the first data is determined by one or more user selections at the first wearable computing device.

10. A method as recited in claim 1, wherein said method further comprises:
(g) providing an indication at the first wearable computing device that the data exchange has been successfully completed.

11. A method as recited in claim 10, wherein the first wearable computing device includes at least a display screen, and wherein the indication is one of an audio sound and a visual indication appearing on the display screen of the first wearable computing device.

12. A method as recited in claim 1, wherein the first wearable computing device is a wearable badge.

13. A method as recited in claim 12, wherein the second wearable computing device is affixed to or embedded in an area or a setting.

14. A method as recited in claim 13, wherein said method is performed at an event in which numerous participants wear wearable badges.

15. A method as recited in claim 1, wherein said displaying (f) displaying of the certain information on the display of the first wearable computing device operates to display the certain information in a series of screens on the display.

16. A method as recited in claim 15, wherein each of the screens of the series of screens are cycled after a predetermined time.

17. A method for exchanging data between wearable computing devices, said method comprising:
(a) determining whether a first wearable computing device can presently communicate with a second wearable computing device;
(b) sending a data exchange request from the first wearable computing device to the second wearable computing device when said determining (a) determines that the first wearable computing device can presently communicate with the second wearable computing device, the data exchange request requesting a data exchange between the first wearable computing device and the second wearable computing device;
(c) receiving a request response at the first wearable computing device, the request response indicating whether the second wearable computing device has authorized the data exchange;
(d) performing the data exchange between the first wearable computing device and the second wearable computing device when the request response indicates that the second wearable computing device has authorized the data exchange; and
(e) thereafter performing social filtering on the data received by at least one of the first wearable computing device and the second wearable computing device based on predetermined criteria.

18. A method as recited in claim 17, wherein said performing (e) the social filtering comprises determining whether the data received matches the predetermined criteria, and
wherein said method further comprises:
(f) notifying the at least one of the first wearable computing device and the second wearable computing device when said determining determines that the data received matches the predetermines criteria.

19. A method as recited in claim 18, wherein at least one of the first wearable computing device and the second wearable computing device is a badge.

20. A method as recited in claim 17, wherein at least one of the first wearable computing device and the second wearable computing device is a badge.

* * * * *

UNITED STATES PATENT AND TRADEMARK OFFICE
CERTIFICATE OF CORRECTION

PATENT NO. : 6,711,414 B1
DATED : March 23, 2004
INVENTOR(S) : Alexander Lightman It is certified that error appears in the above-identified patent and that said Letters Patent is hereby corrected as shown below:

<u>Title page,</u>
Item [75], "Inventors: Alexander Lightman, Santa Monica, CA (US); Thad Starner, Atlanta, GA (US)" should be -- Inventor: Alexander Lightman, Santa Monica, CA (US) --

Signed and Sealed this

Seventeenth Day of August, 2004

JON W. DUDAS
*Acting Director of the United States Patent and Trademark Office*